A. S. BOYER.
Carriage Brake.
No. 98,018.
Patented Dec. 21, 1869.
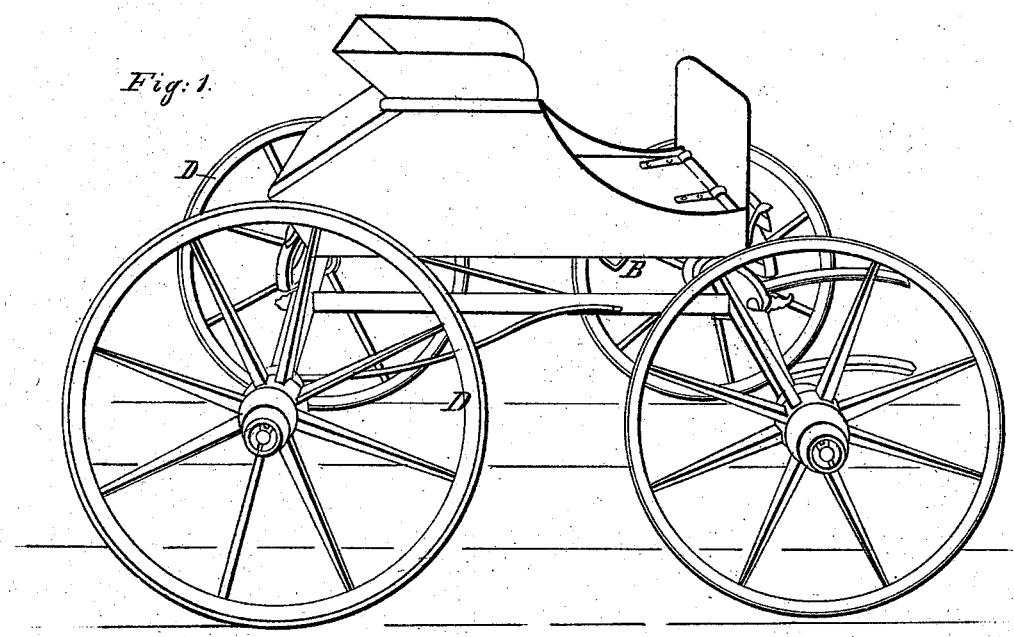
Fig: 1.
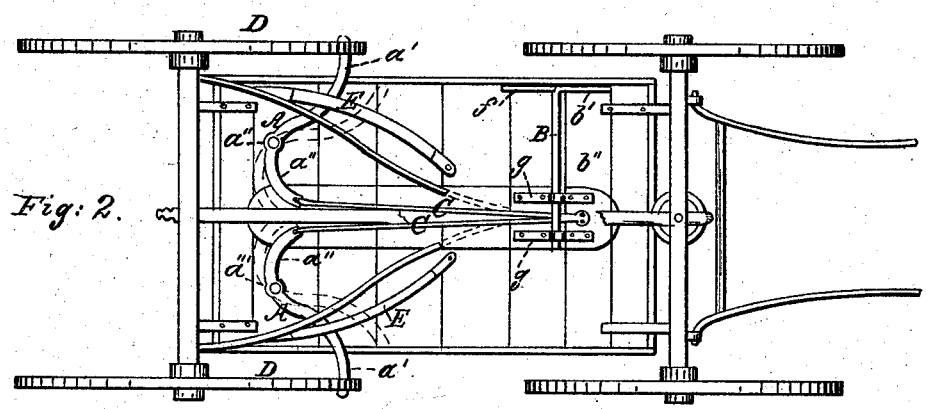
Fig: 2.
Witnesses.
Inventor.

United States Patent Office.

A. S. BOYER, OF BERNVILLE, PENNSYLVANIA.

Letters Patent No. 98,018, dated December 21, 1869.

IMPROVEMENT IN CARRIAGE-BRAKES.

The Schedule referred to in these Letters Patent and making part of the same.

I, A. S. BOYER, of Bernville, in the county of Berks, and State of Pennsylvania, have invented certain Improvements in Brakes for Buggies, and other light vehicles, of which the following is a specification.

Nature and Objects of the Invention.

My invention relates to the combination of certain bent-lever brake-bars, a foot-lever, and connecting-rods, with the under side of the bottom of the body of the vehicle, in such a manner that when the foot-lever is pressed forward and downward, by the foot of the occupant of the vehicle, the longer arms of the brake-bars are caused to be turned outward laterally from the body, into contact with the respective rims of the two rear wheels, so as to check or retard the rolling motions of the latter, or operate as brakes upon the same; but when the position of the said foot-lever is inclined to its normal position, or turned backward, the said brake-bars will also be returned to their normal positions under the body of the vehicle, the object of my invention being not only to afford an easily-operated and effective brake for buggies and other light vehicles, but that will also be unobservable when not in operation upon the wheels.

Description of the Accompanying Drawings.

Figure 1 is a perspective view of a buggy, showing my invention applied thereto, but with the braking-bars and foot-lever retracted into their normal or unobservable positions.

Figure 2 is a plan view of the under side of the vehicle, showing the apparatus in operation as a brake upon the wheels, a portion of the running gear of the vehicle being broken away, for the purpose of better displaying the braking-apparatus.

General Description.

A A are the bent-lever brake-bars;
B, the foot-lever; and
C C, the connecting-rods between the brake-bars and the foot-lever.

The brake-bars A A are each levers of the first class, with their respective arms $a'$ $a''$ curved in opposite directions, in the same plane with the bottom of the vehicle to which they are applied, (see fig. 2,) and secured thereto by their respective fulcrum-pins $a'''$ $a'''$, so that when operated as brakes upon the wheels D D, their longer, or weight-arms $a'$ $a'$, will press backward upon the front of the tire or tread of the same, their shorter, or power-arms $a''$ $a''$, being at the same time drawn forward by the rods C C, operated by means of the foot-lever B.

Curved stay-bars E E have their respective ends bolted firmly to the bottom of the vehicle, so as to afford extended supports for the outer ends of the longer arms $a'$ $a'$ of the respective brake-bars A A, during their vibratory motions, and, especially, also whilst they are being pressed against the rims of the wheels D D in braking.

The foot-lever B is part of a rock-shaft, having one end bent at a right angle, so as to pass upward through a slot, $f$, in the floor of the vehicle, in front of the seat, and present a loop or T-rest for the foot of the operator, whilst the shaft is secured across the under side of the floor of the vehicle, in suitable bearings $g$ $g$, so that it can be rocked backward and forward, it being also connected to the forward ends of the rods C C, by means of an arm, $b''$, which projects in the same direction upward as the arm $b'$ of the foot-lever B.

The rear ends of the rods C C are connected to the ends of the shorter arms $a''$ $a''$ of the brake-bars, and the under side of the bottom of the body has a groove, $h$, made deep enough to allow free play to the rods C C and the short arm $b''$, while the foot-lever is being operated.

When the part $b'$ of the foot-lever is turned back, as indicated by the dotted lines $x$ in fig. 1, the braking-bars A A will be brought into the positions indicated by the dotted lines in fig. 2, and are, therefore, out of sight, or unobservable—a result very desirable and important in the light pleasure-vehicles for which the invention is more especially designed or intended.

In all the brakes heretofore used for vehicles, the levers which carry the braking-blocks remain projecting, to some extent, beyond the sides of the body of the vehicle, after they are withdrawn from contact with the rims of the wheels, and for buggies and other light pleasure-vehicles, these projections are not only unsightly, but they become muddy, and, therefore, soil the clothes of persons getting in and out of the vehicle, whereas, by constructing the braking-levers A A in the bent form shown in fig. 2, and applying them to the under side of the body of the vehicle, so as to turn upon fulcrum-pins $a'''$ $a'''$, respectively, it will be evident, that when the foot-lever B is operated to its limit in withdrawing the said levers A A from the rims of the wheels D D, the projecting or brake-block ends of the said levers will be drawn or turned inward or entirely under the body of the vehicle, and, therefore, not only out of the way in one's getting in or out of the vehicle, but they will not be seen by persons in passing, which are the main objects of my invention.

I am aware that sliding braking-bars have been applied to the under side of the body of a light vehicle, and operated by means of a foot-lever in the vehicle, so as to cause the outer ends of the said bars to press against the rims of the rear wheels of the same in braking, and to remain projecting from the sides of the body of the vehicle, so as to serve also as "steps," for convenience in getting in and out of the same, when the said bars are not in service as brakes.

Therefore, I do not desire to claim, broadly, the application of braking-devices to the under side of the body of the vehicle; but, having fully described my improvement,

I claim, as my invention, in combination with the body of the vehicle, the braking-levers A A, constructed, applied, and operated by a foot-lever, so that they may be entirely withdrawn under the bottom of the said vehicle, or out of sight, when not required or used in braking, substantially as hereinbefore set forth and described.

A. S. BOYER.

Witnesses:
BENJ. MORISON,
WM. H. MORISON.